UNITED STATES PATENT OFFICE.

JOSEPH WILLMANN, OF DERBY, CONNECTICUT, ASSIGNOR TO DAIRY MACHINERY AND CONSTRUCTION COMPANY, INCORPORATED, OF DERBY, CONNECTICUT, A CORPORATION OF CONNECTICUT.

PROCESS OF TREATING BUTTER-FAT AND CONVERTING SAME INTO CREAM.

1,058,508.      Specification of Letters Patent.      Patented Apr. 8, 1913.

No Drawing.      Application filed April 21, 1910. Serial No. 556,725.

*To all whom it may concern:*

Be it known that I, JOSEPH WILLMANN, at present a subject of the Emperor of Germany, having announced my intention of becoming a citizen of the United States, residing at Derby, in the county of New Haven and State of Connecticut, have invented certain new and useful Improvements in Processes of Treating Butter-Fat and Converting Same into Cream, of which the following is a specification.

My present invention has for its object to provide a process of treating butter-fat whereby all moisture and albuminous substances are removed or eliminated and the fat is recovered in a pure, concentrated and stable form which will enable the butter-fat, the valuable constituent of milk, to be transported or stored indefinitely with the greatest economy and without undergoing any chemical, bacteriological or other change or deterioration, the product being in a form and condition that will enable it to be readily emulsified or homogenized with milk, either skimmed or otherwise, to convert it into cream which will be available for use at all times.

According to the present invention, milk is first converted into butter in any suitable or known manner, the butter thus formed is melted, and while hot and in a finely divided state, the butter is subjected to the evaporating action of a current of hot, clean and dry air which absorbs all moisture that may remain in the fat and removes the albuminoids therefrom. The evaporation of the moisture from the fat may be accomplished in any suitable way such, for instance, as by passing it through a tower or chamber such as that disclosed in my pending application filed April 14, 1910, Serial #555509. The fat after being deprived of any remaining moisture is then introduced while hot into receptacles which receptacles are clean and dry, the receptacles being sealed and are then ready for transportation or use. This pure fat cannot serve as a culture medium for organisms that would otherwise split the fat for the reason that such organisms cannot exist without water or moisture. As all water or moisture has been eliminated from the fat, the fat can undergo no bacteriological change. Ordinarily, butter and other milk products are rendered dangerous to health because of the changes which they undergo due to the decomposition of the albuminoids. These albuminoids, however, are eliminated according to the present invention, and the pure fat cannot develop any poisons.

By sealing the fat while hot in tight receptacles, any air contained in such receptacles is pasteurized so that the fat cannot undergo any subsequent change, either while stored or during transportation.

The pure butter-fat, the valuable part of milk, is concentrated according to the present invention so that the space required and the expense incident to transportation and storage are reduced to a minimum. This butter-fat is the basic product used in various industries such, for instance, as in the manufacture of ice cream, and the present invention enables the concentrated fat to be prepared when milk is available and the fat may be stored for use whenever needed.

The present invention also provides a convenient method of preparing pure cream of a high grade from the butter-fat, the butter-fat being mixed with absolutely pure milk, skimmed milk being suitable and the mixture being passed through an emulsifier or homogenizer which is capable of permanently homogenizing the solid and liquid constituents of the mixture, a homogenizer suitable for the purpose being disclosed in my prior Patent, #973,328 granted October 18, 1910, a perfectly sanitary cream being thereby obtained with the greatest convenience and it is available whenever desired. Cream prepared in this way is superior to the ordinary cream, as the ordinary cream is generally full of peptonizing organisms and is dangerous owing to the poisons which are developed upon the decay of the albuminoids.

I claim as my invention:—

1. The hereindescribed process which consists in removing moisture from butter to concentrate and render the same stable, keeping the concentrated stable butter until required for use, mixing the butter so treated with milk, and homogenizing the resulting mixture to form cream.

2. The hereindescribed process which consists in removing moisture and the albuminoids from butter to concentrate and render the same stable, storing the butter until required for use, mixing the butter so treated with milk, and homogenizing the resulting mixture to form cream.

3. The herindescribed process which consists in melting butter, subjecting the melted butter while in a finely divided condition to the action of a current of hot dry air to clean the butter and remove moisture therefrom, storing the butter until required for use, mixing the resulting butter fat with milk, and homogenizing the mixed butter fat and milk to form cream.

In testimony whereof I have hereunto set my hand in presence of two subscribing witnesses.

JOSEPH WILLMANN.

Witnesses:
 DANIEL I. DAVIS,
 HOWARD B. PECK.